United States Patent [19]
Fellows et al.

[11] 3,823,672
[45] July 16, 1974

[54] HIGH SPEED GROUND TRANSPORTATION SYSTEMS

[75] Inventors: Thomas George Fellows, Barnet; David John Ivor Garstin, Newmarket; Michael Charity, Cambridge, all of England

[73] Assignee: Tracked Hovercraft Limited, London, England

[22] Filed: July 7, 1972

[21] Appl. No.: 269,831

[30] Foreign Application Priority Data
July 15, 1971 Great Britain .................... 33393/71

[52] U.S. Cl. ..... 104/148 MS, 104/134, 104/148 LM
[51] Int. Cl. ............................................ B61b 13/00
[58] Field of Search ......... 104/23 FS, 134, 148 LM, 104/148 MS, 148 SS

[56] References Cited
UNITED STATES PATENTS

| | | | |
|---|---|---|---|
| 3,125,964 | 3/1964 | Silverman | 104/23 FS |
| 3,158,765 | 11/1964 | Polgreen | 104/148 LM |
| 3,631,806 | 1/1972 | Barthalon | 104/148 MS |
| 3,678,860 | 7/1972 | Veldhuizen | 104/23 FS |
| 3,703,869 | 11/1972 | Randell | 104/23 FS |

FOREIGN PATENTS OR APPLICATIONS
707,032  5/1941  Germany .................... 104/148 MS Primary Examiner—Lloyd L. King
Assistant Examiner—D. W. Keen
Attorney, Agent, or Firm—Cameron, Kerkam, Sutton, Stowell & Stowell

[57] ABSTRACT

In a transportation system comprising a prepared track and a vehicle having levitation means such as an air cushion for supporting the vehicle above the track, roll control of the vehicle is effected by on or more pairs of electromagnets co-operating with magnetic material extending along the track. The magnets are normally energised so as to exert a substantially constant downward force in opposition to but less than upward forces exerted by the levitation means, and means are provided responsive to forces exerted on the vehicle tending to produce a rolling movement thereof for controlling the energisation of the electromagnets so that they act differentially to counteract a rolling movement of the vehicle. Further pairs of magnets comparably controlled may be provided to guide the vehicle.

9 Claims, 5 Drawing Figures

HIGH SPEED GROUND TRANSPORTATION SYSTEMS

This invention relates to high speed ground transportation systems.

According to one aspect of the present invention a transportation system comprises a prepared track and a vehicle for operation therealong, levitation means being provided to support the vehicle above the track, in which at least one pair of laterally spaced magnets is carried by the vehicle to co-operate with correspondingly spaced magnetic members extending along the track and adapted in operation to produce forces acting in opposition to forces produced by the levitation means supporting the vehicle, to counteract rolling movements to the vehicle.

The levitation means may, comprise one or more cushions of pressurised gas or means for producing electromagnetic repulsion between electric currents on vehicle and track.

According to a preferred feature of the present invention at least one further pair of controllable magnets is carried by the vehicle for magnetic co-operation with the or further magnetic members extending along the track, the magnets of the or each further pair being arranged to produce on the vehicle opposed and generally horizontal forces, to guide the vehicle along the track.

In order that the invention may be more fully understood three embodiments of a transportation system in accordance with the invention will now be described, by way of example, with reference to the accompanying diagrammatic drawings in which.

Figure 1:
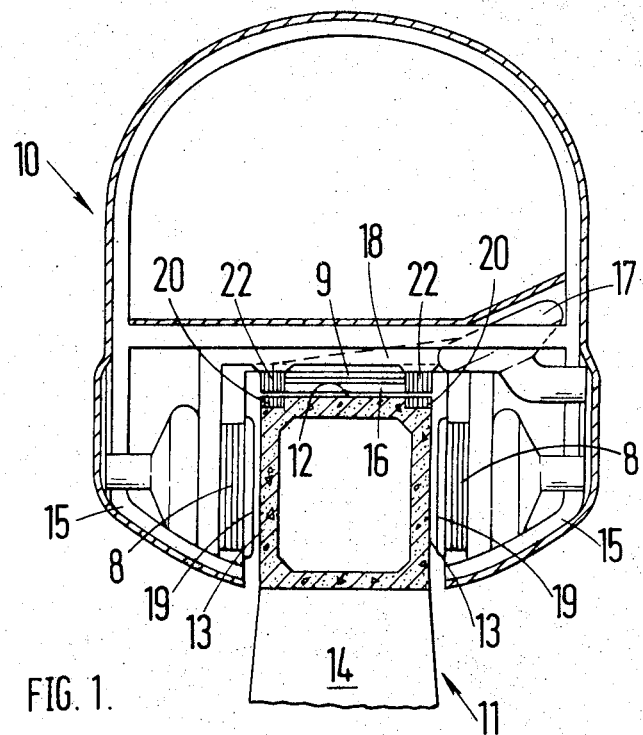
FIG. 1 is a transverse sectional view of a first embodiment.

Referring now to FIG. 1, a vehicle 10 is arranged for operation along a prepared track 11 having a horizontal top surface 12 flanked by downwardly extending vertical side surfaces 13, formed by rectangular section beams which are supported at intervals by pillars 14.

The vehicle straddles the track, having side portions 15 which extend downwardly from the main part of the vehicle body to embrace the side track surfaces 13.

Vehicle support is provided by two cushions of pressurised gas which co-operate with the top track surface 12 the cushions being formed by two longitudinally spaced cushion pads 16 resiliently mounted by flexible bellows 9 and mechanical springs and dampers (not shown) on the underneath of the vehicle body. The pads 16 (of which only one is visible) are individually supplied with pressurised air from fans 17 via ducts 18 and the bellows 9, and form and contain their respective cushions by means of peripheral curtains of pressurised gas which issue from their undersides in known manner.

Guidance of the vehicle along the track is effected by two longitudinally spaced pairs of mutually opposed gas cushion pads 19 carried by the side portions 15 of the vehicle body by means of further flexible bellows 8 and mechanical springs and dampers. The guidance pads 19 are individually supplied, and operate in an identical way to the support pads 16 to form and maintain cushions of pressurised gas between themselves and the opposed track surfaces 13.

Figure 2:
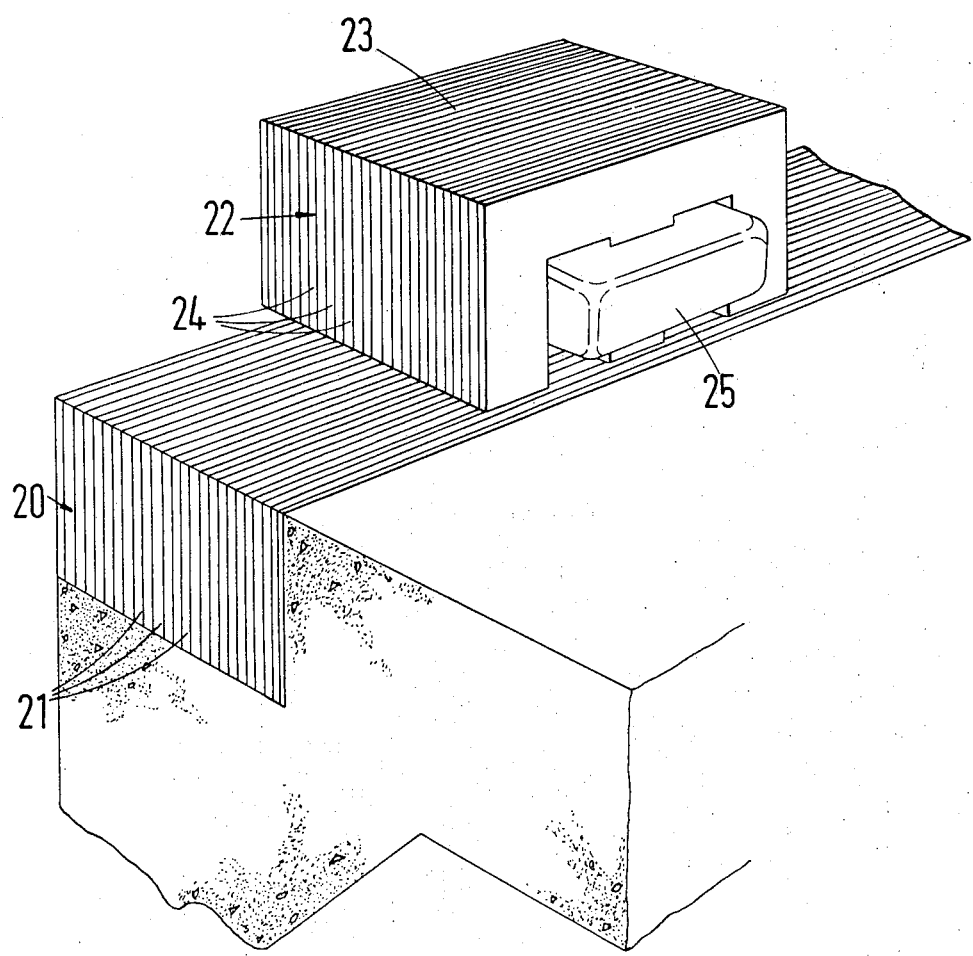
FIG. 2 is a perspective view, on an enlarged scale, of a roll controlling magnet carried by the vehicle and an associated magnetic member extending along the track of the system of FIG. 1.

Extending along the top corners of the track are two magnetic members 20 of generally rectangular cross section formed of vertical magnetic laminations 21 (see FIG. 2).

Two pairs of laterally spaced electromagnets 22 (only one pair being visible) are carried by the vehicle at longitudinally spaced dispositions, being, in the arrangement illustrated, directly connected to the underside of the vehicle body where it opposes the top track surface 12, the two electromagnets 22 on each side of the vehicle being arranged to co-operate with the respective member 20. As is shown in FIG. 2 each electromagnet 22 has a ferromagnetic core 23 as wide as the respective member 20 and formed of longitudinally orientated, vertical and generally E-shaped magnetic laminations 24.

Around the central limb of its core 23 formed from the central arms of the constituent laminations 24, each electromagnet 22 is wound with a multiturn energising coil 25. The coils 25 of the electromagnets 22 are connected to suitable electrical supply and control means of which the operation is later to be described.

In operation the vehicle is driven along the track by means not shown, for example a shrouded propeller or a linear induction motor of which the primary member is carried by the vehicle and the secondary member is mounted on the track. Support and guidance for the vehicle as it travels along the track is provided by the support and guidance gas cushion pads 16, 19 as previously described. Roll stability for the vehicle is provided by the electromagnets 22. During normal operation, i.e., with no rolling moment imposed on the vehicle, the electromagnets are energised to exert on the vehicle equal downward forces which are in opposition to (and considerably less than) the upward forces exerted on the vehicle by the support pads 16.

Should, however, a rolling moment be exerted on the vehicle, this will be sensed by means arranged directly or indirectly to operate the control means to reduce or remove the energisation of the electromagnets 22 tending to move downwardly and to so increase the energisation of the electromagnets tending to move upwardly that, despite the increase in the air gaps at which these latter electromagnets may be operating, the downward forces they produce on the vehicle are increased. In this way the electromagnets 22 are controlled differentially in pairs to produce on the vehicle a moment about its longitudinal axis in opposition to the rolling moment, so that the rolling motion of the vehicle is at least reduced if not substantially prevented.

Figure 3:
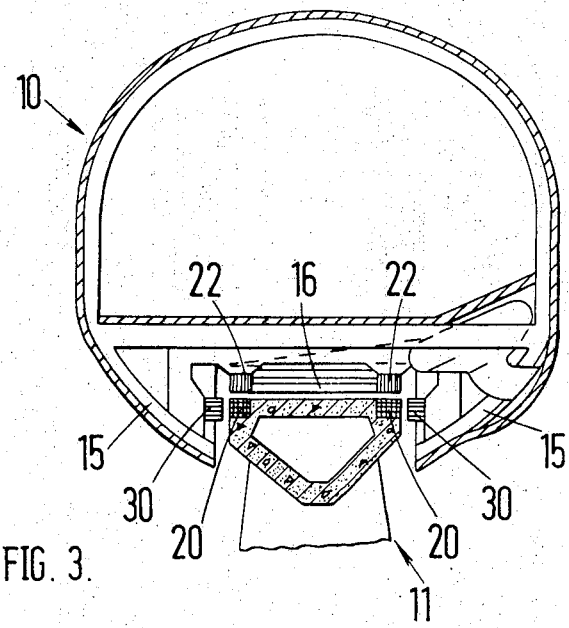
FIG. 3 is a transverse sectional view of a second embodiment.

FIG. 3 shows a second emodiment of the invention similar to the first embodiment so far as the provision of vehicle support and roll stability is concerned, but different from the first embodiment in its vehicle guidance. In FIG. 3 vehicle guidance is provided electromagnetically by two further pairs of electromagnets 30 (only one pair being visible) similar to the electromagnets 22, carried by the side portions 15 of the vehicle at longitudinally spaced dispositions for co-operation with the magnetic members 20 on a common horizontal plane. The guidance electromagnets 30 are connected to suitable second supply and control means which control them so as to provide a centralising force whenever the vehicle moves laterally relative to the track from its central position. To generate this centralising force the second supply and control means operate in an analogous manner to the first, reducing or removing the energisation of the two guidance electromagnets on the side of the vehicle which is approaching the track and increasing the energisation of the other two guidance electromagnets.

Since in FIG. 3 the members 20 have to co-operate with electro-magnets 22, 30 which are mutually orientated at 90° so far as their flux paths are concerned, they are of different form from the like-numbered members of FIG. 1. In FIG. 3 each member 20 is deeper than the members 20 of FIG. 1 (being in depth as wide as the co-operating electromagnets) and is formed of individually insulated wires of square cross-section extending longitudinally of the track.

Whereas in FIG. 1 the guidance gas cushion pads 19 are low pressure devices operating for example at gauge pressures of 1 to 5 pounds per square inch, the guidance electromagnets 30 of FIG. 3 can produce much higher force densities. Because of this the depth of the side portions 15 can be considerably decreased, so leading to reduced vehicle side and frontal areas with the concomitant advantages.

Figure 4:
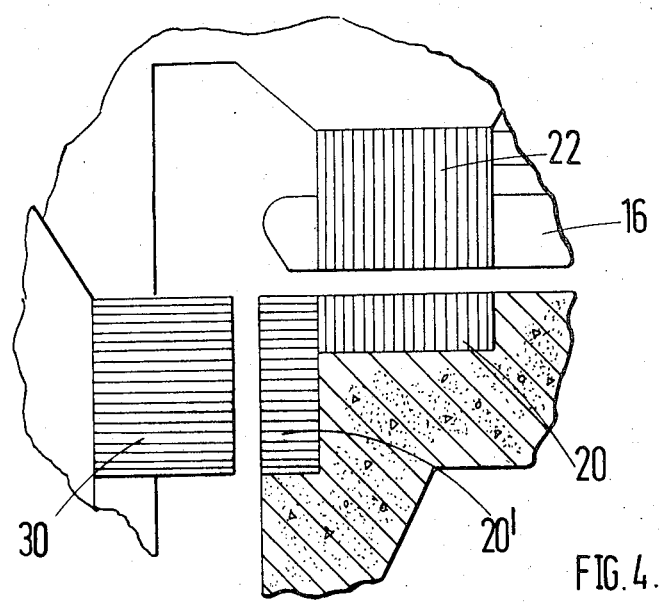
FIG. 4 is an enlarged sectional view of a roll controlling magnet, and a guidance magnet of the system of FIG. 3, illustrating separate magnetic members which may be provided therefor.

In the modification of the arrangement of FIG. 3 illustrated in FIG. 4, separate ferromagnetic members 20, 20' are respectively provided for the roll control electromagnets 22 and the guidance electromagnets 30. The members 20 are mounted inboard of the members 20' (which form the top corners of the track) and the roll control electromagnets 22 are mounted on the vehicle to correspond. The members 20 are identical in composition to the like-numbered members of FIG. 1; the members 20' are formed of horizontal, longitudinally extending magnetic laminations.

Figure 5:
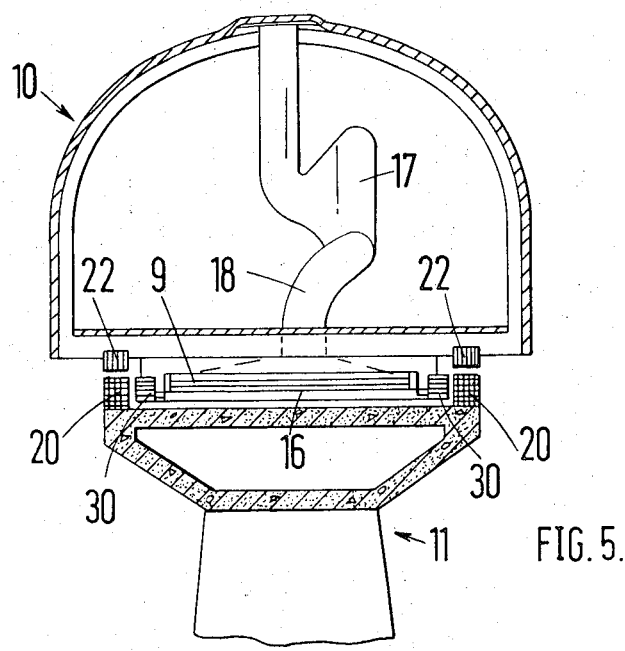
FIG. 5 is a transverse sectional view of a third embodiment.

FIG. 5 shows a further embodiment of the invention which differs from the arrangement of FIG. 3 in the position of the ferromagnetic members 20. Whereas in FIG. 3 the members 20 are inset (so that the track presents an unobstructed surface for the supply pads 16) and the electromagnets 30 act inwardly to provide guidance, in FIG. 5 the members 20 are mounted on top of the track and the guidance electromagnets 30 act outwardly.

The FIG. 3 arrangement has advantage over the FIG. 5 arrangement in that all, as opposed to only part, of the track width can be used for support, but in some respects is inferior to the FIG. 5 arrangement so far as vehicle switching is concerned.

As described in relation to FIG. 4, FIG. 5 can be modified by the provision of separate ferromagnetic members for the guidance and roll control functions, the members for the roll control function being inset into the top deck surface inboard of the members provided for guidance, and the roll control electromagnets being positioned on the vehicle to correspond.

The members 20 of FIG. 3 have a considerable portion of their material which is largely redundant so far as flux carrying is concerned. In a further, non-illustrated, modification of the system of FIG. 3 the members 20 are L-shaped in cross section with the angle forming the corner of the track and with each arm having a thickness which is just sufficient to pass the flux of the respective electromagnets 22 or 30 without saturation. This leads to a better utilisation of the magnetic material than in the system of FIG. 3.

In arrangements such as those of FIGS. 3 and 5 having roll control and guidance electromagnets arranged to co-operate with a common ferromagnetic member on the track, it may be desirable to offset the electromagnets longitudinally of one another to prevent interaction.

Preferably the roll control electromagnets 22 are offset longitudinally of the vehicle from the support pads 16 so that the support cushions can occupy substantially the whole available width of the track, with suitable allowance made for lateral movement of the vehicle. The roll control electromagnets may, however, overlap the support pads longitudinally of the vehicle, in which case the support pads are at least locally made narrower to accomodate them.

Although in the described embodiments the ferromagnetic members 20 are laminated, it is believed that in some applications of the invention it may be possible to use solid ferromagnetic members.

To perform their roll control function the electromagnets 22 are conveniently controlled by a common supply and control circuit including means responsive to rolling movements of the vehicle or to forces tending to produce such movements. Alternatively each electromagnet or at least each pair of electromagnets may be controlled individually for example by means sensing the air gap at which they are operating. Such an arrangement would enable them to provide pitch and heave stability for the vehicle, so helping the support pads 16 in those respects.

In a similar way the guidance electromagnets 30 (where provided) may be individually controlled to provide yaw stability for the vehicle.

Circuits which can be used or readily adapted for controlling the electromagnets 22, 30 are described in German Patent Specification 643,316 and British Patent Specification 1,165,704.

In the described embodiments the electromagnets are directly attached to the vehicle body. They may however be attached thereto in a resilient and damped manner, and in particular may be carried by a subframe or bogie connected to the vehicle body by suspension means adapted to transmit the roll or other counteracting forces generated by the electromagnets to the vehicle body. Alternatively the roll control electromagnets may be rigidly attached to the sides of the support pads which are themselves attached to the vehicle body by a secondary suspension which is capable of transmitting rolling moments between support pad and vehicle body. Such an arrangement has the advantage that the roll control electromagnets provide stability for the support pads at least in roll. Where guidance electromagnets are provided they may also be attached to the composite support pad/roll control electromagnet assembly.

A particular feature of the described embodiments is that the roll control electromagnets act in parallel with, but in opposition to, the gas cushion support pads. The loading of the support cushions by the electromagnets in this way increases the support cushion stiffnesses and so enable the support pads better to follow the track. This additional cushion stiffness may be sufficient to enable a linear induction motor primary member for vehicle propulsion to be rigidly mounted on the support pad(s) particularly if the roll control electromagnets are themselves mounted on the pad(s) so that their own stiffnesses (by virtue of their control) act in parallel with the cushion stiffness.

Even if the roll control electromagnets are mounted on the vehicle body independently of the support pads, it is believed that by virtue of their arrangement in parallel with the support pads, they will increase the heave stability of the vehicle.

Although in the described embodiments vehicle support is provided by means of gas cushions, it is envisaged that support may alternatively be effected by other levitations means such as means adapted to generate repulsive forces between co-acting electric currents on the vehicle and track. Like the gas cushion support of the described embodiments, this enables the large unidirectional forces required for support to be reasonably provided in a contactless manner.

While in the described embodiments each electromagnet and its associated ferromagnetic member are arranged for their mutual flux to pass in a vertical and longitudinal plane, they may be arranged for the flux to pass in a transverse plane.

It will be understood that the roll control electromagnets normally exert a substantially constant downwardly acting biassing force or preload on the vehicle. Although it may not be essential it is thought desirable in order to obtain the most benefit from the "active"-suspension that the magnets provide, so to control the energisation of the individual magnets of each pair of magnets to occasion a variation in the forces exerted thereby so that they act differentially to combat roll, that the total preload exerted by the pair of magnets remains substantially constant. Similar consideration may apply to the guidance magnets.

Although it has been assumed that the roll control and guidance magnets described will act by direct attraction, shear forces which magnets exhibit may be utilised for roll or other control functions desired of the magnets. Furthermore it may be possible to employ magnets other than electromagnets such as, for example, permanent magnets having energisable pole pieces to augment or reduce the permanent magnetic flux.

The precise manner in which the magnets are controlled will of course depend on their type, disposition and the function they are to perform, and may be effected wholly or partially by mechanical, magnetic or electrical means. The number of magnets employed and their disposition is also a matter of selection. In principle one pair of roll control magnets could suffice but in practice two or more pairs of magnets will almost certainly be required.

We claim:

1. A transportation system comprising a prepared track and a vehicle for operation therealong, levitation means being provided to support the vehicle above the track, in which at least one pair of laterally spaced controllable electromagnets is carried by the vehicle to co-operate with correspondingly spaced magnetic members extending along the track and adapted in operation to produce forces acting in opposition to forces produced by the levitation means supporting the vehicle, to counteract rolling movements of the vehicle, and in which at least one further pair of controllable electromagnets is carried by the vehicle for magnetic co-operation with magnetic members extending along the track and adapted in operation to produce on the vehicle opposed and generally horizontal forces to guide the vehicle relative to the track.

2. A transportation system as claimed in claim 1 in which the magnets for counteracting rolling movements of the vehicle are normally arranged to exert a substantially constant force acting in opposition to the forces produced by the levitation means to support the vehicle.

3. A transportation system as claimed in claim 1 in which control means are provided operative to vary the forces individually exerted by the magnets for counteracting rolling movements of the vehicle to combat a rolling movement thereof whilst maintaining the total forces exerted by said magnets sustantially constant.

4. A transportation system as claimed in claim 1 in which at least two pairs of magnets are provided for counteracting rolling movements of the vehicle, the pairs being longitudinally spaced with respect to the vehicle and controllable so as to exert on the vehicle forces to combat pitch or heave thereof.

5. A transportation system comprising a prepared track and a vehicle for operation therealong, the vehicle being provided with air cushion means to support the vehicle above the track, in which at least two pairs of laterally spaced electro-magnets are carried by the vehicle for magnetic co-operation with magnetic material extending along the track, means being provided normally to maintain the electro-magnets energised so as to exert a substantially constant downward force in opposition to but less than upward forces exerted by the air cushion means, there also being provided means responsive to forces exerted on the vehicle tending to produce a rolling movement thereof for controlling the energisation of each electromagnet of the said pair of electromagnets to occasion a variation in the forces exerted by the said magnets so that they act differentially to counteract a rolling movement of the vehicle.

6. A transportation system as claimed in claim 5 in which the control means are operative whilst varying the forces exerted by the magnets to counteract roll, to maintain the total forces exerted thereby substantially constant.

7. A transportation system as claimed in claim 5 in which the air cushion means comprise at least one air cushion pad and means for forming and maintaining a cushion of pressurised air between the pad and the track, including suspension means connecting the pad to the vehicle body, the suspension means being capable of transmitting rolling moments between the pad and the vehicle body, the said pairs of electromagnets being carried by the pad.

8. A transportation system as claimed in claim 5 including suspension means connecting the said pairs of electromagnets to the vehicle body, the said suspension means being operative to transmit roll counteracting forces generated by the electromagnets to the vehicle body.

9. A transportation system as claimed in claim 5 including at least two further pairs of electromagnets carried by the vehicle for magnetic co-operation with magnetic material extending along the track, the said further pairs of electromagnets being so arranged as, when energised, to produce on the vehicle opposed and generally horizontal forces, and means for controllably energising the magnets to produce a centralising force on the vehicle in the event of it moving laterally from a central position relative to the track.

* * * * *